(12) United States Patent
Takaya et al.

(10) Patent No.: US 8,118,344 B2
(45) Date of Patent: Feb. 21, 2012

(54) SLIDE DOOR STRUCTURE OF VEHICLE

(75) Inventors: Hirotaka Takaya, Hiroshima (JP);
Motoki Yoshida, Hiroshima (JP);
Katsunori Monden, Hiroshima (JP);
Takahiro Shinoda, Hiroshima (JP)

(73) Assignee: Mazda Motor Corporation (JP)

( * ) Notice: Subject to any disclaimer, the term of this patent is extended or adjusted under 35 U.S.C. 154(b) by 250 days.

(21) Appl. No.: 12/500,086

(22) Filed: Jul. 9, 2009

(65) Prior Publication Data

US 2010/0078961 A1  Apr. 1, 2010

(30) Foreign Application Priority Data

Sep. 29, 2008  (JP) .................................. 2008-251099

(51) Int. Cl.
*B60J 5/06* (2006.01)

(52) U.S. Cl. ..................................................... 296/155

(58) Field of Classification Search .................. 296/155, 296/146.9, 146.11
See application file for complete search history.

(56) References Cited

U.S. PATENT DOCUMENTS

| 3,312,015 | A  | * | 4/1967 | Plegat ............................. 49/213 |
| 7,669,367 | B2 | * | 3/2010 | Shimura et al. .................. 49/213 |
| 2001/0006298 | A1 | * | 7/2001 | Tsubokura et al. ........... 296/155 |
| 2008/0129085 | A1 | * | 6/2008 | Kim et al. ..................... 296/155 |

FOREIGN PATENT DOCUMENTS

JP  09-002065  1/1997

* cited by examiner

*Primary Examiner* — H Gutman
(74) *Attorney, Agent, or Firm* — Studebaker & Brackett PC; Donald R. Studebaker

(57) ABSTRACT

There is provided a slide door structure of a vehicle which has a slide door to slide in a vehicle longitudinal direction at a side of a vehicle body, comprising a center rail which extends in the vehicle longitudinal direction at the side of the vehicle body so as to guide a roller provided at the slide door, and an expansion preventing bracket which is provided at a front end portion of the center rail so as to connect a pair of guide-face portions which face to each other for preventing an expansion of a center-rail end. Accordingly, the expansion of guide-rail end can be prevented in case the outward load acts on the slide door when the slide door is in the closed state.

7 Claims, 7 Drawing Sheets

SLIDE DOOR STRUCTURE OF VEHICLE

BACKGROUND OF THE INVENTION

The present invention relates to a slide door structure of a vehicle which has a slide door to slide in a vehicle longitudinal direction at a side of a vehicle body.

Conventionally, the slide door which slides in the vehicle longitudinal direction to open and close a door opening is well known as a side door provided at the side of the vehicle body (see Japanese Patent Laid-Open Publication No. 9-2065, for example). This slide door has been used well in so-called one-box type of vehicles.

In such vehicles, a rail (guide rail) extending in the vehicle longitudinal direction is disposed at the side portion of the vehicle, and rollers to rotate and move along the guide rail are provided at the slide door. Thereby, the slide door slides in the vehicle longitudinal direction so as to open or close as the rollers rotate and move along the guide rail.

In general, the guide rail comprises a pair of guide face portions which face to each other vertically, a fixing face portion which connects respective inside end portions of the guide face portions and is to be fixed to the side portion of the vehicle body, and an opening which is formed between respective outside end portions of the guide face portions. Thus, the guide rail has a cross section which is of a U shape with its outside end opening outward. The rollers are rotatably supported at a support member which extends through the above-described opening between the guide face portions of the guide rail, so that the rollers can rotate and move along the guide rail, having a vertical guidance by the guide face portions.

In the above-described vehicle equipped with the slide door, in case a force acts on the slide door outward in the vehicle width direction when the slide door is in a closed state, the outward force is applied to the rollers via a door body of the slide door. This outward force acts on the pair of guide face portions of the guide rail. Herein, in case the outward force is relatively large, there may occur a so-called expansion of guide-rail end in which the above-described opening between the guide face portions of the guide rail expands.

This expansion of guide-rail end may cause an improper outward displacement of the roller, so that there is a concern that the rollers would be derailed off the guide roller in an extreme case. The greater the above-described outward displacement of the rollers becomes, the greater a gap between the side face of the vehicle body and the door body of the slide door becomes when the slide door is in the closed state. Consequently, there is a problem in that the stable support of the slide door would deteriorate.

The slide door is generally configured to engage with the vehicle-body side via a latch/striker mechanism, a so-called catcher/pin mechanism, or the like when the slide door is in the closed state. Herein, in case the above-described outward-acting load is considerably large, the side portion of the vehicle body would deform partially. Consequently, the above-described mechanism could not stand the load properly, so that there is a problem in that the gap between the side face of the vehicle body and the slide door would become improperly large.

SUMMARY OF THE INVENTION

The present invention has been devised in view of the above-described problems, and an object of the present invention is to provide a slide door structure of a vehicle which can prevent the above-described expansion of guide-rail end in case the outward load acts on the slide door when the slide door is in the closed state.

According to the present invention, there is provided a slide door structure of a vehicle which has a slide door to slide in a vehicle longitudinal direction at a side of a vehicle body, comprising a guide rail extending in the vehicle longitudinal direction at the side of the vehicle body so as to guide a roller provided at the slide door, and an expansion preventing bracket provided at a front end portion of the guide rail so as to connect a pair of guide-face portions which face to each other for preventing an expansion of guide-rail end. Thereby, the expansion of guide-rail end at the front end portion of the guide rail can be prevented by the expansion preventing bracket. Accordingly, the enlargement of the gap between the side face of the vehicle body and the slide door which may be caused by the expansion of guide-rail end can be effectively prevented, thereby ensuring the stable support of the slide door.

According to an embodiment of the present invention, the roller and the side door are connected by a connecting bracket, and a first engagement portion is provided at the expansion preventing bracket and a second engagement portion is provided at the connecting bracket, the second engagement portion coming to engage with the first engagement portion in case a load which is a specified value or greater acts on the slide door outward in a vehicle width direction when the slide door is in a closed state. Thereby, the enlargement of the gap between the side face of the vehicle body and the slide door can be surely prevented.

According to another embodiment of the present invention, the guide rail is a center rail to support a middle portion of the slide door in a vehicle vertical direction for guiding the slide door in the vehicle longitudinal direction via the roller, and the center rail comprises the pair of guide-face portions which face to each other vertically and an opening of the guide-rail end which is formed between outside end portions of the pair of guide-face portions. Thus, the above-described advantages of the present invention can be effectively provided to the center rail which tends to have the problem of expansion of guide-rail end.

According to another embodiment of the present invention, the connecting bracket is equipped with a filler-lid stopper to prevent the slide door from sliding rearward beyond a specified distance when a filler lid is open, and the second engagement portion is provided at the filler-lid stopper. Thereby, the second engagement portion can be provided by using the existing member of the filler-lid stopper, not by using a new additional member, so that the structure can be simplified with low costs.

According to another embodiment of the present invention, the expansion preventing bracket includes a vertical wall portion which extends in an extending direction of the center rail on the outside of the center rail, the first engagement portion comprises a first bending portion which bends toward the center rail from the vertical wall portion, and the second engagement portion comprises a second bending portion which bends toward the vertical wall portion from the filler-lid stopper. Thereby, the engagement function can be obtained surely.

Other features, aspects, and advantages of the present invention will become apparent from the following description which refers to the accompanying drawings.

DETAILED DESCRIPTION OF THE INVENTION

Hereinafter, a preferred embodiment of the present invention will be described referring to the accompanying drawings.

Figure 1:
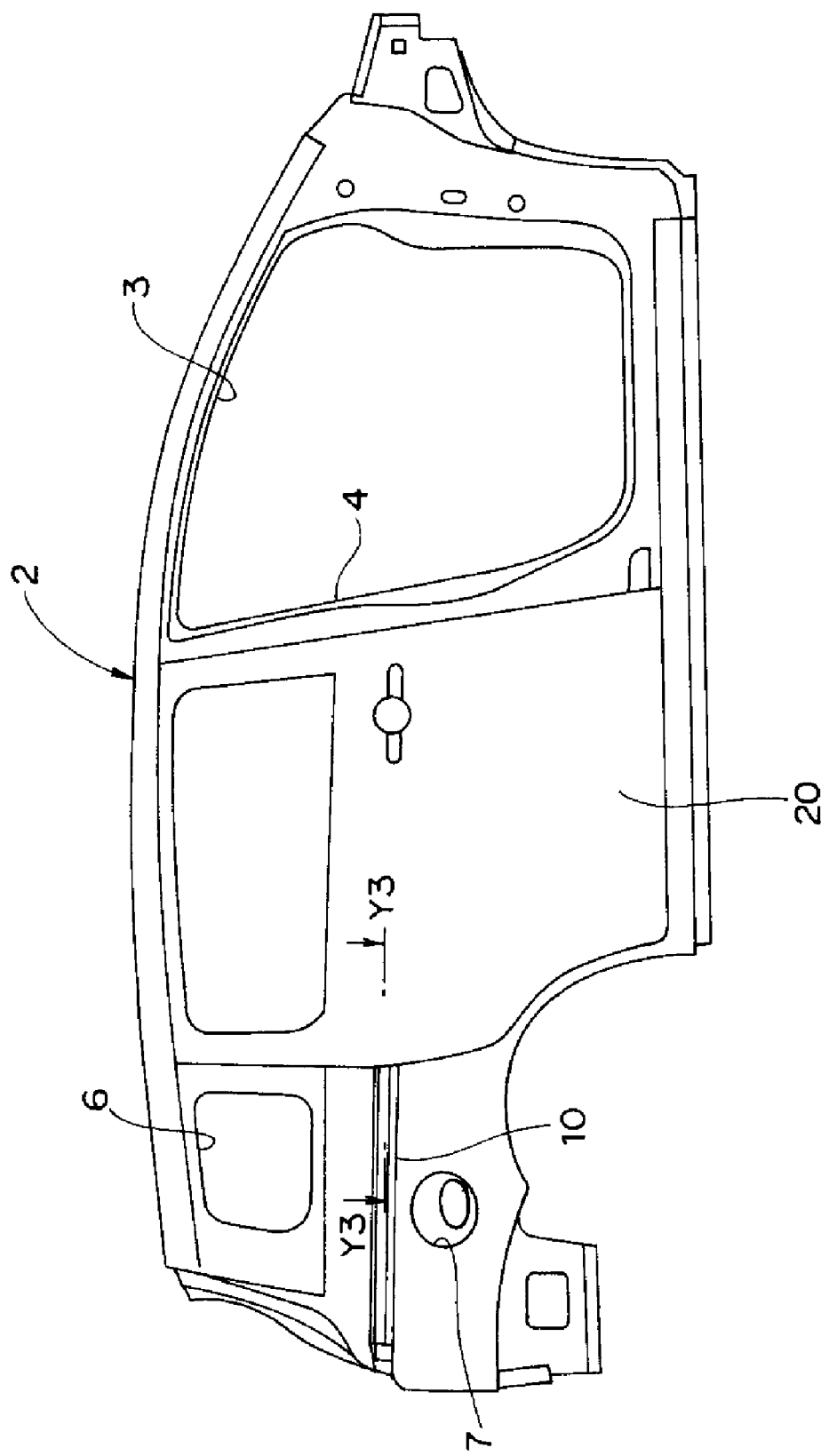
FIG. 1 is an explanatory side view of a right-side side panel of a vehicle body of an automotive vehicle with a slide door according to an embodiment of the present invention.
Figure 2:
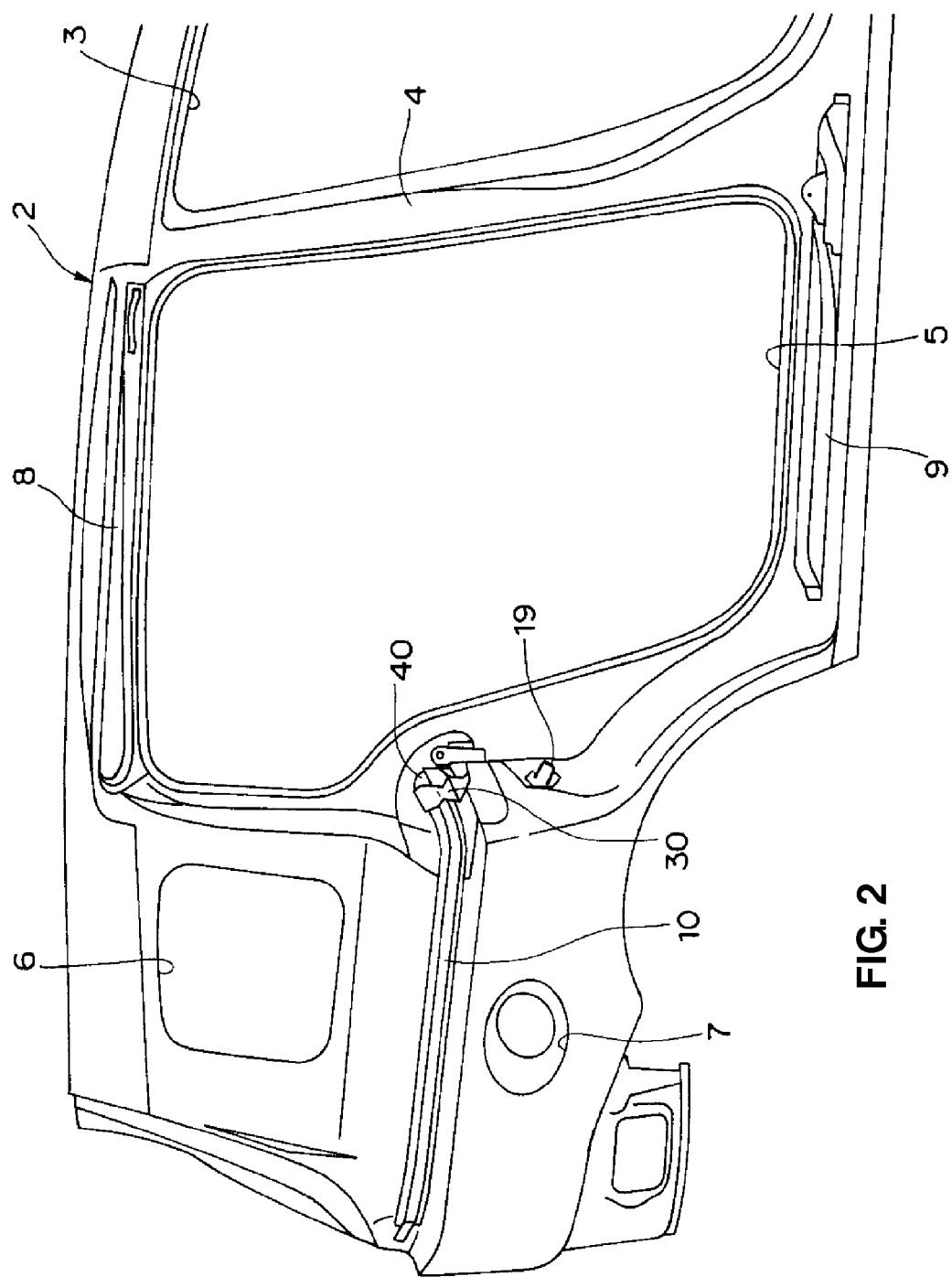
FIG. 2 is a partial enlarged side view of a major portion of the right-side side panel of the vehicle body.

FIG. 1 is an explanatory side view of a right-side side panel of a vehicle body of an automotive vehicle with a slide door according to an embodiment of the present invention. FIG. 2 is a partial enlarged side view of a major portion of the right-side side panel of the vehicle body.

As shown in these figures, a slide door 20 of the automotive vehicle according to the present embodiment is provided at a side portion of a vehicle body so as to slide in a vehicle longitudinal direction for opening or closing a rear-side door opening 5. Herein, a front-side door opening 3 which is formed in front of a center pillar 4 is opened or closed by a normal hinge type of door (not illustrated).

Upper and lower guide rails 8, 9 are provided respectively at upper and lower edge portions of the rear-side door opening 5 of a side panel 2 of the vehicle body to guide upper and lower portions of the slide door 20 relative to the vehicle body so that the slide door 20 moves in the vehicle longitudinal direction. Further, a center rail 10 is provided at a rear portion of the side panel 2 behind the rear-side door opening 5 to guide a middle portion of the slide door 20 in a vertical direction so that the slide door 20 moves in the vehicle longitudinal direction.

A striker 19 is provided at a specified portion of a rear edge portion of the rear-side door opening 5 which is located slightly below the middle portion in the vertical direction. The striker 19 engages with a latch (not illustrated) which is provided at the slide door 20 when the slide door 20 is in the closed state, so that the slide door 20 can engage with the side portion of the vehicle body. In addition, a so-called catcher/pin mechanism is preferably provided at a front edge portion of the rear-side door opening 5 to engage with a front end portion of the slide door 20.

The center rail 10 extends in the vehicle longitudinal direction below a rear-window opening 6. A front end of the center rail 10 slightly curves inward along a shape of a side edge portion of the rear-side door opening 5. Herein, the outside of the center rail 10 is covered with a decorative member (not illustrated) which is made from synthetic resin or the like when the vehicle is fully assembled so that the exterior view of the vehicle can be improved.

An opening 7 for a fuel supply system to fill a fuel tank (not illustrated) is formed at a specified position below the center rail 10. This opening 7 is covered with a filler lid (not illustrated) when the vehicle is fully assembled.

Figure 3:
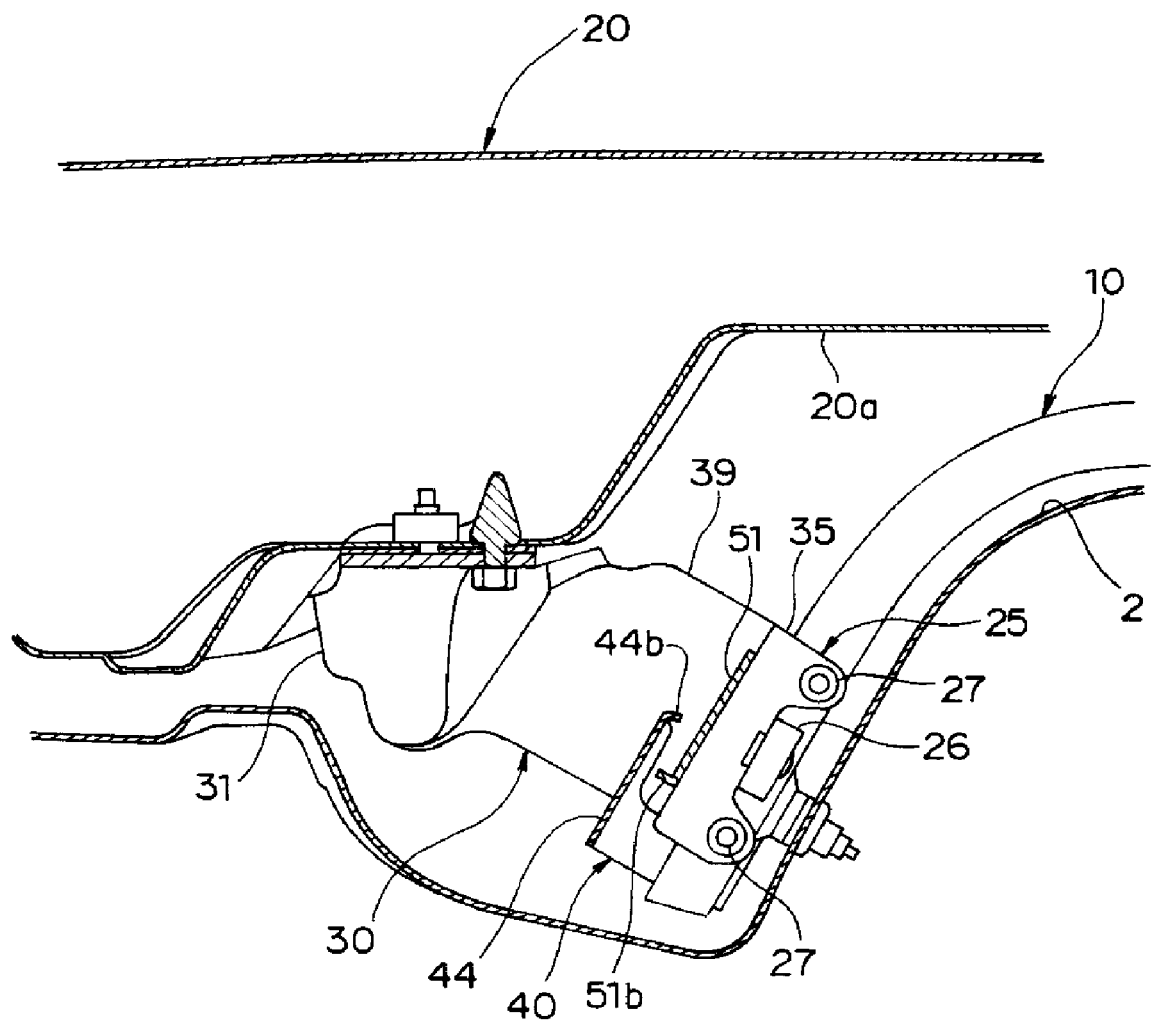
FIG. 3 is a sectional view taken along line Y3-Y3 of FIG. 1, which shows a front end of a center rail and its vicinity when the slide door is in a closed state.
Figure 4:
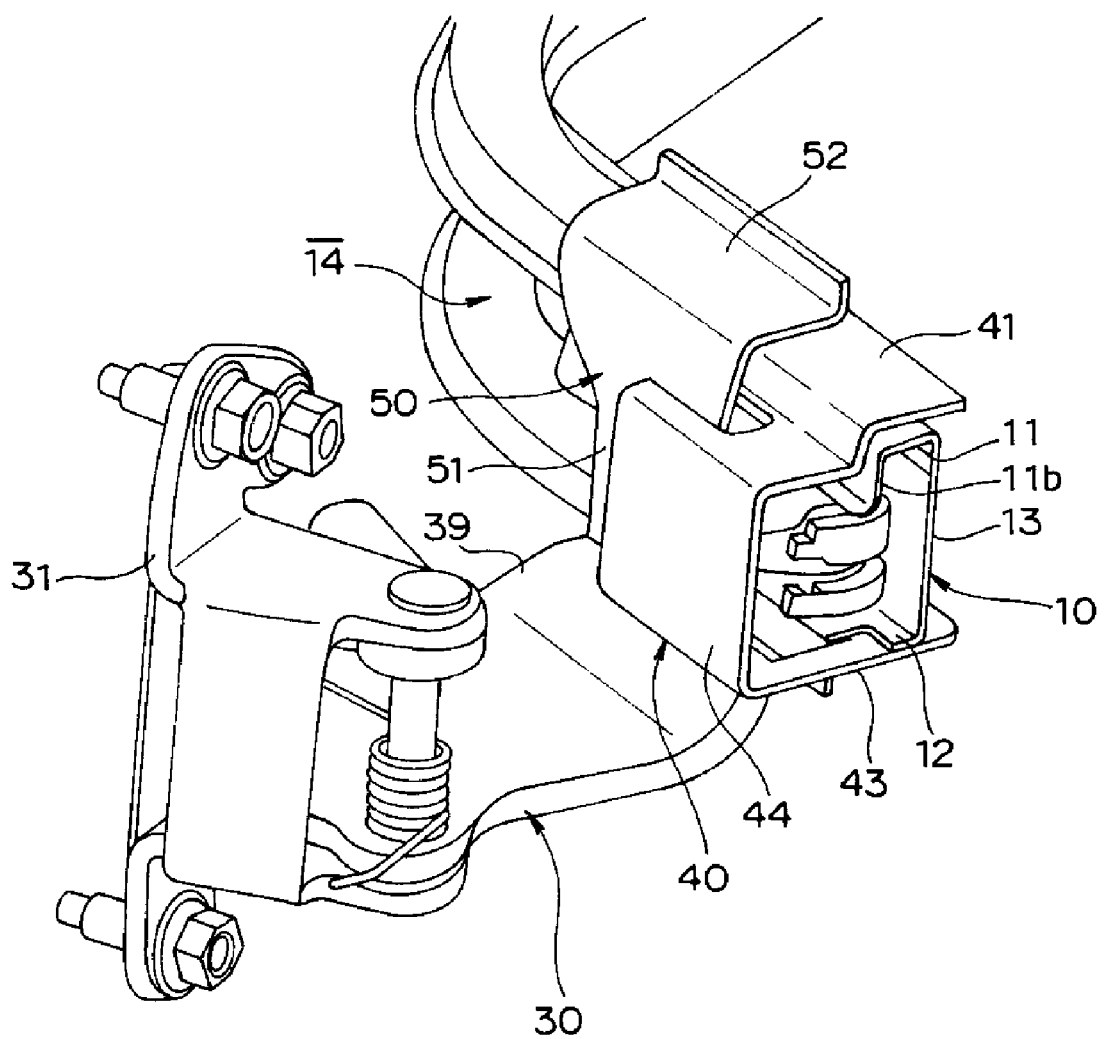
FIG. 4 is an enlarged perspective view of the front end of the center rail and its vicinity.

FIG. 3 is a sectional view taken along line Y3-Y3 of FIG. 1, showing the front end of the center rail and its vicinity when the slide door is in the closed state. FIG. 4 is an enlarged perspective view of the front end of the center rail and its vicinity. As apparent from FIG. 3, the slide door 20 has a roller unit 25 which includes plural rollers 26, 27 rotatable along the center rail 10 at its rear end portion and a connecting bracket 30 which connects the roller unit 25 and the slide door 20 (specifically, an inner panel 20a of the slide door 20).

Figure 5:
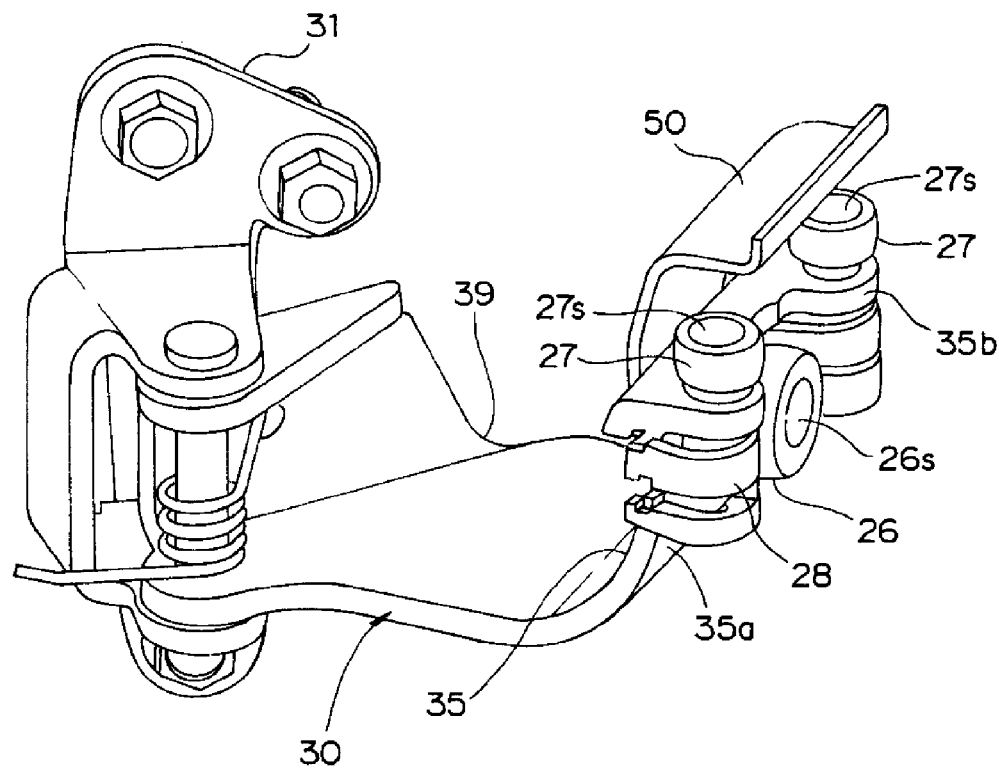
FIG. 5 is an enlarged perspective view of a connecting bracket and a roller unit.

FIG. 5 is an enlarged perspective view of the connecting bracket 30 and the roller unit 25. As apparent from this figure, the roller unit 25 comprises a vertical roller 26 which is rotatably supported at a horizontally-extension axis 26s and a pair of lateral rollers 27, 27 which are rotatably supported at vertically-extending axes 27s. The vertical roller 26 restricts a slide movement of the slide door 20 in the vertical direction, and the lateral rollers 27, 27 restrict a slide movement of the slide door 20 in the vehicle width direction.

The connecting bracket 30 comprises a door bracket portion 31 which is fixed to the inner panel 20a of the slide door 20, a unit base portion 35 which forms an attaching base portion of the roller unit 25, and a connecting plate portion 39 which connects the unit base portion 35 and the door bracket portion 31. The unit base portion 35 is located at an inward end portion of the connecting bracket 30, and it is formed such that it rises upward and then its tip portion bends substantially horizontally.

The axis 26s of the vertical roller 26 is attached to a rising portion 35a of the unit base portion 35. The axes 27s of the lateral rollers 27 are fixed to a horizontal portion 35b which bends substantially horizontally. Lower potions of the axes 27s are held by roller holders 28. Herein, the slide door 20 is an electrically driven type of door according to the present embodiment, and a wire (not illustrated) which may be driven by an electric motor is coupled to the roller holder 28, for example.

As apparent from FIG. 4, the center rail 10 comprises a pair of upper and lower guide-face portions 11, 12 which face to each other vertically, a fixing face portion 13 which connects respective inside end portions of the guide face portions 11, 12 and is to be fixed to the side portion of the vehicle body, and an opening 14 of the guide-rail end which is formed between outside end portions of the pair of guide-face portions 11, 12. Thus, the center rail 10 has a cross section which is of a U shape with its outside end opening outward. A bending guide face portion 11b which bends downward is formed at an outside end portion of the upper guide face portion 11 to guide the outside of the lateral rollers 27, 27.

In a state in which the roller unit 25 has been assembled to the center rail 10, the horizontal portion 35b of the unit base portion 35 extends through the opening 14 of the center rail, the vertical roller 26 is located between the upper guide face portion 11 and the lower guide face portion 12, and the lateral rollers 27, 27 are located between the fixing face portion 13 and the bending guide face portion 11b.

The connecting bracket 30 slides in the vehicle longitudinal direction in a state in which the horizontal portion 35b of the unit base portion 35 extends through the opening 14 of the center rail 10. The roller 26 rotates between the upper guide face portion 11 and the lower guide face portion 12, and the lateral rollers 27, 27 rotate between the fixing face portion 13 and the bending guide face portion 11b. Thus, the slide door 20 can slide smoothly in the longitudinal direction along the center rail 10.

In case the load acts on the slide door 20 outward in the vehicle width direction when the slide door 20 is in the closed state, the bending guide face portion 11b which bends downward from the outside end portion of the upper guide face portion 11 of the center rail 10 is pushed outward by the lateral rollers 27, 27. Herein, in case the above-described load is considerably large, there exists an outward deformation of the bending guide face portion 11b. Thereby, there is a concern that there may occur the so-called expansion of guide-rail end in which the opening between the guide face portions 11, 12 of the center rail 10 expands.

According to the present embodiment, there is provided an expansion preventing bracket 40 which is provided at a front end portion of the center rail 10 so as to connect the guide-face portions 11, 12 for preventing the expansion of the guide-rail end in case the load acts on the slide door 20 outward in the vehicle width direction when the slide door 20 is in the closed state (see FIGS. 3 and 4).

Figure 6:
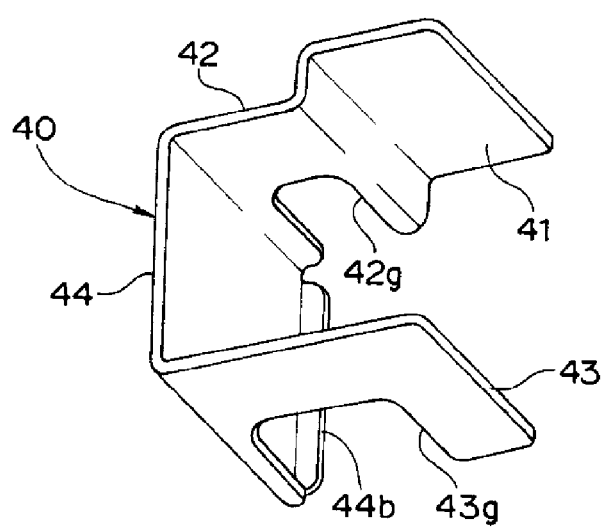
FIG. 6 is a perspective view of an expansion preventing bracket.

FIG. 6 is a perspective view of the expansion preventing bracket 40. As apparent from FIGS. 4 and 6, the expansion preventing bracket 40 comprises an upper fixing face portion 41 which is to be fixed to an upper side of the upper guide face portion 11 of the center rail 10, an upper horizontal face portion 42 which lowers from the outside end portion of the upper fixing face portion 41 along the bending guide face portion 11b of the upper guide face portion 11 and extends horizontally, a lower fixing face portion 43 which is to be fixed to a lower side of the lower guide face portion 12 of the center rail 10, and a vertical wall portion 44 which vertically connects respective outside end portions of the upper and lower fixing face portions 42, 43 and extends in a direction of disposition of the center rail 10 covering the opening 14 on the outside of the center rail 10.

Further, a first bending portion 44b which bends inward (i.e., toward the center rail 10) is formed at a rear end portion of the vertical wall portion 44. This first bending portion 44b performs a function of a first engagement portion set forth in the claims of the present application. Further, slots 42g, 43g are formed at the upper and lower fixing face portions 42, 43 respectively as shown. The upper fixing face portion 41 is fixed to the upper guide face portion 11 of the center rail 10, while the lower fixing face portion 43 is fixed to the lower guide face portion 12 of the center rail 11, respectively by means of spot welding, for example.

To the connecting bracket 30 is attached a filler-lid stopper 50 (see FIGS. 3, 4 and 5) which prevents the slide door 20 from sliding rearward beyond a specified distance when a filler lid (not illustrated) which covers the opening 7 of the fuel supply system is open. That is, the filler-lid stopper 50 prevents interference of the slide door 20 with the filler lid after the vehicle has been fully assembled. Herein, a mechanism of preventing the slide door 20 from sliding rearward beyond the specified distance by using the filler-lid stopper 50 is similar to known art in a field of the electrically driven type of slide door, so detailed drawings and descriptions of the mechanism is omitted here.

Figure 7:
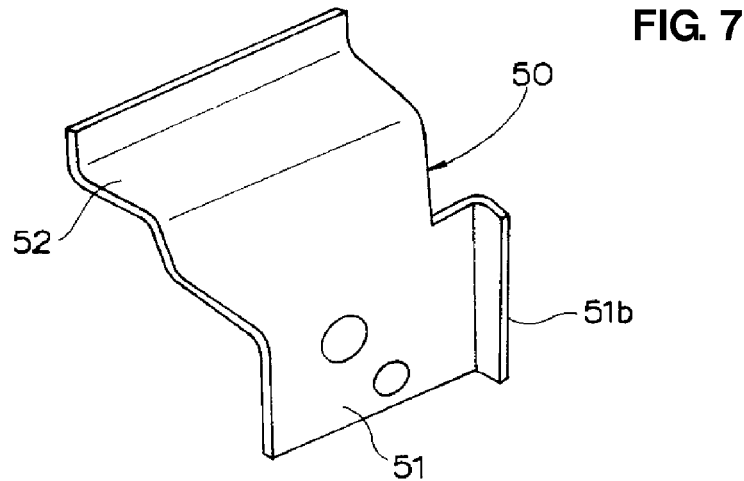
FIG. 7 is a perspective view of a filler-lid stopper to be attached to the connecting bracket, when viewed from a vehicle outside.
Figure 8:
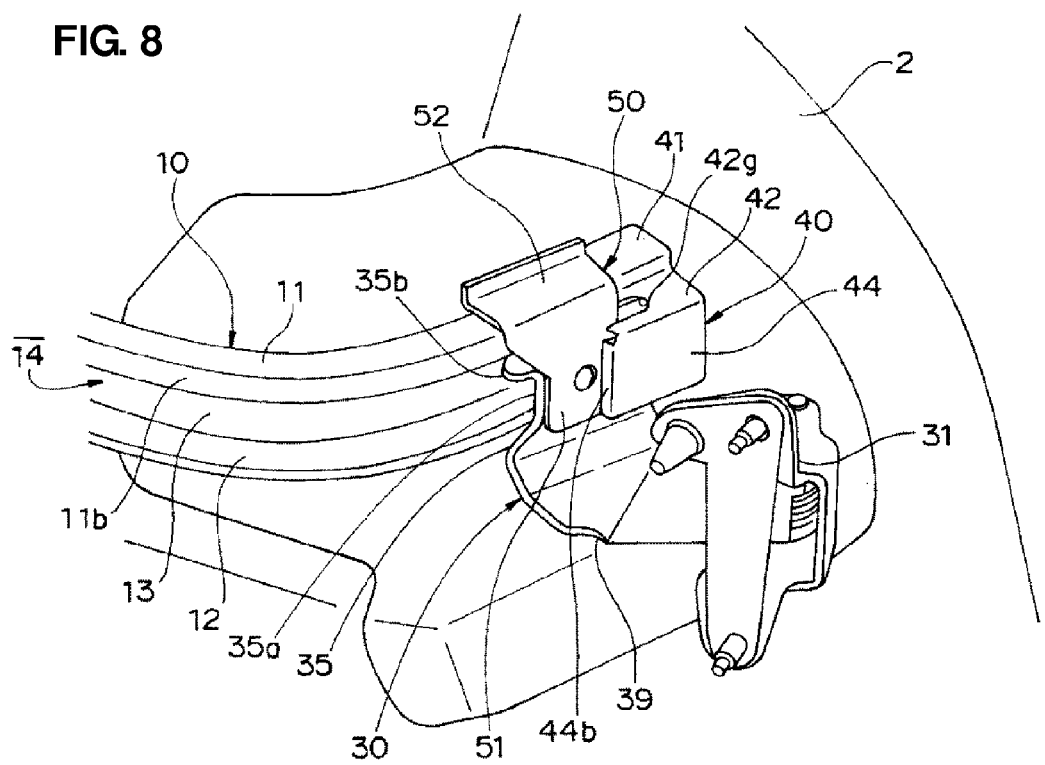
FIG. 8 is a perspective view of the filler-lid stopper and the expansion preventing bracket in a state in which the connecting bracket is assembled to the center rail.

FIG. 7 is a perspective view of the filler-lid stopper 50 which is to be attached to the connecting bracket 30, when viewed from the vehicle outside. FIG. 8 is a perspective view of the filler-lid stopper 50 and the expansion preventing bracket 40 in a state in which the connecting bracket 30 is assembled to the center rail 10.

As apparent form these figures, the filler-lid stopper 50 is formed of a bent plate member and comprises an attaching base portion 51 which is to be fixed to the outside of the rising portion 35a of the unit base portion 35 of the connecting bracket 30 and a slide face portion 52 which bends from an upper end of the attaching base portion 51 and slides on the upper side of the upper guide face portion 11 of the center rail 10.

Further, a second bending portion 51b which bends outward (i.e., toward the vertical wall portion 44 of the expansion preventing bracket 40) is formed at the front end portion of the attaching base portion 51. This second bending portion 51b performs a function of a second engagement portion set forth in the claims of the present application. The attaching base portion 51 of the filler-lid stopper 50 is fixed to the rising portion 35a of the unit base portion 35 of the connecting bracket 30 by means of spot welding, for example.

The rising portion 35a and the filler-lid stopper 50 are located within the slots 42g, 43g formed at the upper and lower fixing face portions 42, 43 when the unit base portion 35 with the rising portion 35a being fixed to the filler-lid stopper 50 has been assembled to the center rail 10 as shown in FIGS. 4 and 8. Accordingly, any interference with the expansion preventing bracket 40 can be avoided surely.

Figure 9:
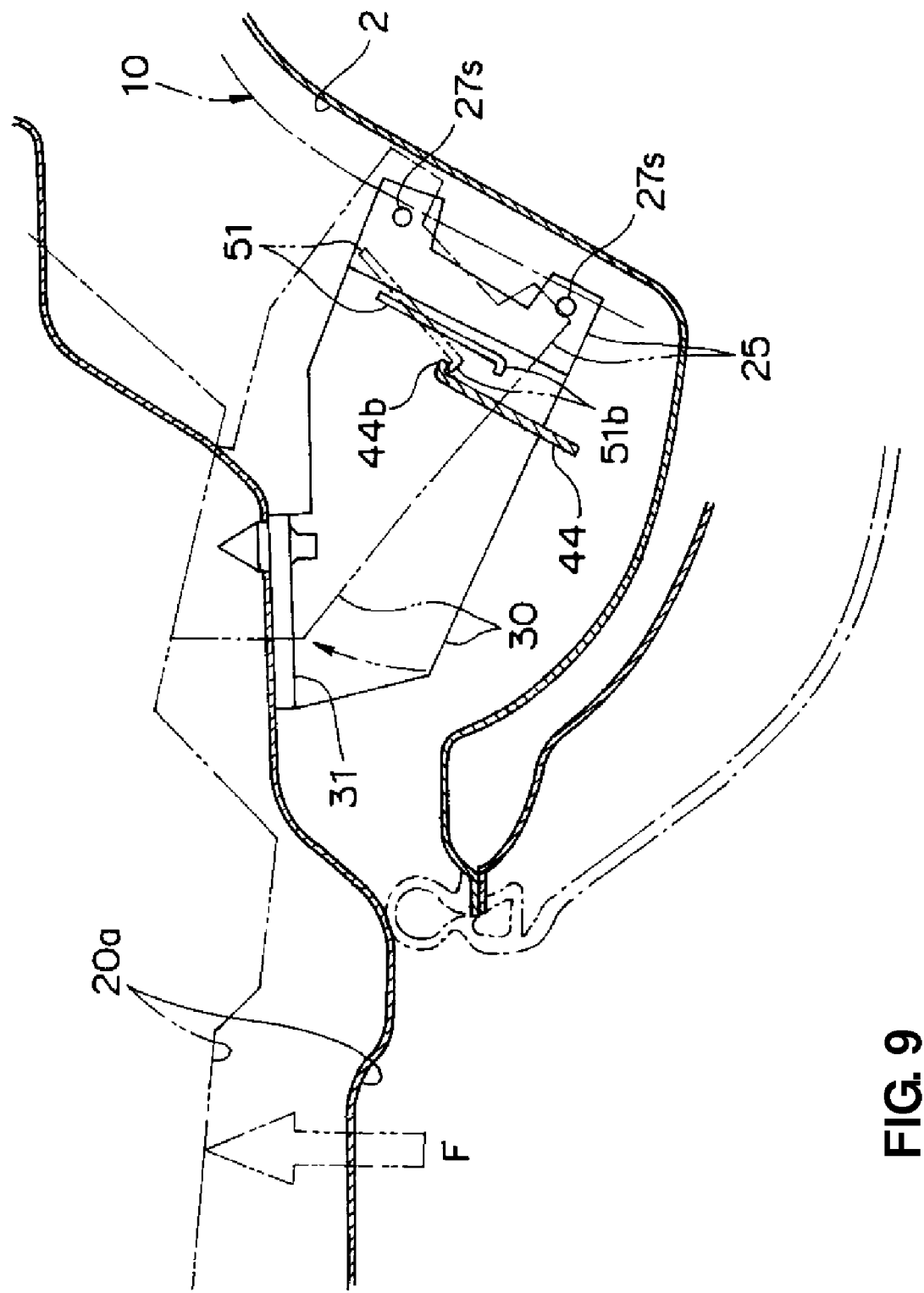
FIG. 9 is an explanatory diagram schematically showing a movement state of the connecting bracket in case a load acts on the slide door outward in a vehicle width direction when the slide door is in the closed state.

FIG. 9 is an explanatory diagram schematically showing a movement state of the connecting bracket 30 in case the load acts on the slide door outward in the vehicle width direction when the slide door is in the closed state. As apparent from FIGS. 3 and 9, in case the outward load F does not act, the second bending portion 51b formed at the front end portion of the attaching base portion 51 of the filler-lid stopper 50 is sufficiently away from the first bending portion 44b formed at the rear end portion of the vertical wall portion 44 of the expansion preventing bracket 40. Meanwhile, in case the outward load F is smaller than a specified value, the deformation of the inner panel 20a of the slide door 20 is so small that the second bending portion 51b does not engage with the first bending portion 44b.

Meanwhile, in case the outward load F is the specified value or greater, as shown by two dotted broken lines in FIG. 9, the deformation of the inner panel 20a of the slide door 20 becomes large, so that the connecting bracket 30 and the filler-lid stopper 50 rotate greatly toward the outside. Consequently, the second bending portion 51b comes to engage with the first bending portion 44b, thereby restricting further movements of the connecting bracket 30 and the filler-lid stopper 50.

Thus, it can be prevented for the rollers 26, 27 held at the unit base portion 35 of the connecting bracket 30 to move outward further. In particular, the bending guide face portion 11b of the upper guide face portion 11 of the center rail 10 can be prevented from moving outward, thereby preventing the expansion of the center-rail end. Accordingly, the enlargement of the gap between the side face of the vehicle body and the slide door 20 which may be caused by the expansion of center-rail end can be effectively prevented, thereby ensuring the stable support of the slide door 20.

As described above, according to the present embodiment, there is provided the expansion preventing bracket 40 which is provided at the front end portion of the guide rail (center rail 10) extending in the vehicle longitudinal direction to guide the rollers 26, 27 so as to connect the guide-face portions 11, 12 which face to each other for preventing the expansion of guide-rail end. Thereby, in case the load acts on the slide door 20 outward in the vehicle width direction when the slide door 20 is in the closed state, the enlargement of the gap between the side face of the vehicle body 2 and the slide door 20 which may be caused by the expansion of guide-rail end can be effectively prevented, thereby ensuring the stable support of the slide door 20.

Further, in case the load which is the specified value or greater acts on the slide door 20 outward in the vehicle width direction when the slide door 20 is in the closed state, the second engagement portion (the second bending portion 51*b* of the attaching base portion 51 of the filler-lid stopper 50) which is provided at the connecting bracket 30 connecting the rollers 26, 27 and the slide door 20 comes to engage with the first engagement portion (the first bending portion 44*b* of the vertical wall portion 44) which is provided at the expansion preventing bracket 40. Thereby, the enlargement of the gap between the side face of the vehicle body, i.e., the side panel and the slide door 20 can be surely prevented.

In particular, according to the center rail 10 which supports the middle portion of the slide door 20 in the vehicle vertical direction for guiding the slide door 20 in the vehicle longitudinal direction via the rollers and comprises the pair of guide-face portions 11, 12 which face to each other vertically and the opening 14 of the guide-rail end which is formed between outside end portions of the pair of guide-face portions 11, 12, the above-described advantages of the present embodiment can be effectively provided to the center rail 10 which tends to have the problem of expansion of guide-rail end.

Moreover, the second engagement portion (the second bending portion 51*b* of the attaching base portion 51 of the filler-lid stopper 50) provided at the connecting bracket 30 is provided at the filler-lid stopper 50 which prevents the slide door 20 from sliding rearward beyond the specified distance when the filler lid (not illustrated) is open. Thereby, the second engagement portion can be provided by using the existing member of the filler-lid stopper 50, not by using a new additional member, so the structure can be simplified with low costs.

Specifically, in case the load acts on the slide door 20 outward in the vehicle width direction when the slide door 20 is in the open state, the second bending portion 51*b* which bends from the filler-lid stopper 50 toward the vertical wall portion 44 of the expansion preventing bracket 40 comes to engage with the first bending portion 44*b* which bends from the vertical wall portion 44 of the expansion preventing bracket 40 toward the centre rail 10. Thereby, the expansion prevention of the guide-rail end can be obtained surely.

While the right side of the vehicle body was mainly described above, the left side of the vehicle has substantially the same structure as the right side except the opening 7 of the fuel supply system which is not provided at the left-side part of the vehicle.

The present invention should not be limited to the above-described embodiment, and any other modifications and improvements may be applied in the scope of a spirit of the present invention.

What is claimed is:

1. A slide door structure of a vehicle which has a slide door to slide in a vehicle longitudinal direction at a side of a vehicle body, comprising:
    a guide rail extending in the vehicle longitudinal direction at the side of the vehicle body so as to guide a roller provided at the slide door; and
    an expansion preventing bracket provided at a front end portion of the guide rail so as to connect a pair of guide-face portions which face to each other for preventing an expansion of a guide-rail end.

2. The slide door structure of a vehicle of claim 1, wherein the roller and the side door are connected by a connecting bracket, and a first engagement portion is provided at the expansion preventing bracket and a second engagement portion is provided at the connecting bracket, the second engagement portion coming to engage with the first engagement portion in case a load acts on the slide door outward in a vehicle width direction when the slide door is in a closed state.

3. The slide door structure of a vehicle of claim 2, wherein said connecting bracket is equipped with a filler-lid stopper to prevent the slide door from sliding rearward when a filler lid is open, and said second engagement portion is provided at the filler-lid stopper.

4. The slide door structure of a vehicle of claim 3, wherein said expansion preventing bracket includes a vertical wall portion which extends in an extending direction of the guide rail on an outside of the guide rail, said first engagement portion comprises a first bending portion which bends toward the guide rail from the vertical wall portion, and said second engagement portion comprises a second bending portion which bends toward the vertical wall portion from the filler-lid stopper.

5. The slide door structure of a vehicle of claim 1, wherein said guide rail is a center rail to support a middle portion of the slide door in a vehicle vertical direction for guiding the slide door in the vehicle longitudinal direction via the roller, and the center rail comprises said pair of guide-face portions which face to each other vertically and an opening of the guide-rail end which is formed between outside end portions of the pair of guide-face portions.

6. A slide door structure of a vehicle which has a slide door to slide in a vehicle longitudinal direction at a side of a vehicle body, comprising:
    a guide rail extending in the vehicle longitudinal direction at the side of the vehicle body so as to guide a roller provided at the slide door; and
    an expansion preventing bracket provided at a front end portion of the guide rail so as to connect a pair of guide-face portions which face to each other for preventing an expansion of a guide-rail end,
    wherein the roller and the side door are connected by a connecting bracket, and a first engagement portion is provided at the expansion preventing bracket and a second engagement portion is provided at the connecting bracket, the second engagement portion coming to engage with the first engagement portion in case a load acts on the slide door outward in a vehicle width direction when the slide door is in a closed state, and
    wherein said guide rail is a center rail to support a middle portion of the slide door in a vehicle vertical direction for guiding the slide door in the vehicle longitudinal direction via the roller, and the center rail comprises said pair of guide-face portions which face to each other vertically and an opening of the guide-rail end which is formed between outside end portions of the pair of guide-face portions.

7. A slide door structure of a vehicle which has a slide door to slide in a vehicle longitudinal direction at a side of a vehicle body, comprising:
    a guide rail extending in the vehicle longitudinal direction at the side of the vehicle body so as to guide a roller provided at the slide door; and
    an expansion preventing bracket provided at a front end portion of the guide rail so as to connect a pair of guide-face portions which face to each other for preventing an expansion of a guide-rail end,
    wherein the roller and the side door are connected by a connecting bracket, and a first engagement portion is provided at the expansion preventing bracket and a second engagement portion is provided at the connecting bracket, the second engagement portion coming to engage with the first engagement portion in case a load acts on the slide door outward in a vehicle width direction when the slide door is in a closed state, wherein said guide rail is a center rail to support a middle portion of the slide door in a vehicle vertical direction for guiding the slide door in the vehicle longitudinal direction via the roller, and the center rail comprises said pair of guide-face portions which face to each other vertically and an opening of the guide-rail end which is formed between outside end portions of the pair of guide-face portions, and wherein said connecting bracket is equipped with a filler-lid stopper to prevent the slide door from sliding rearward when a filler lid is open, and said second engagement portion is provided at the filler-lid stopper.

* * * * *